UNITED STATES PATENT OFFICE.

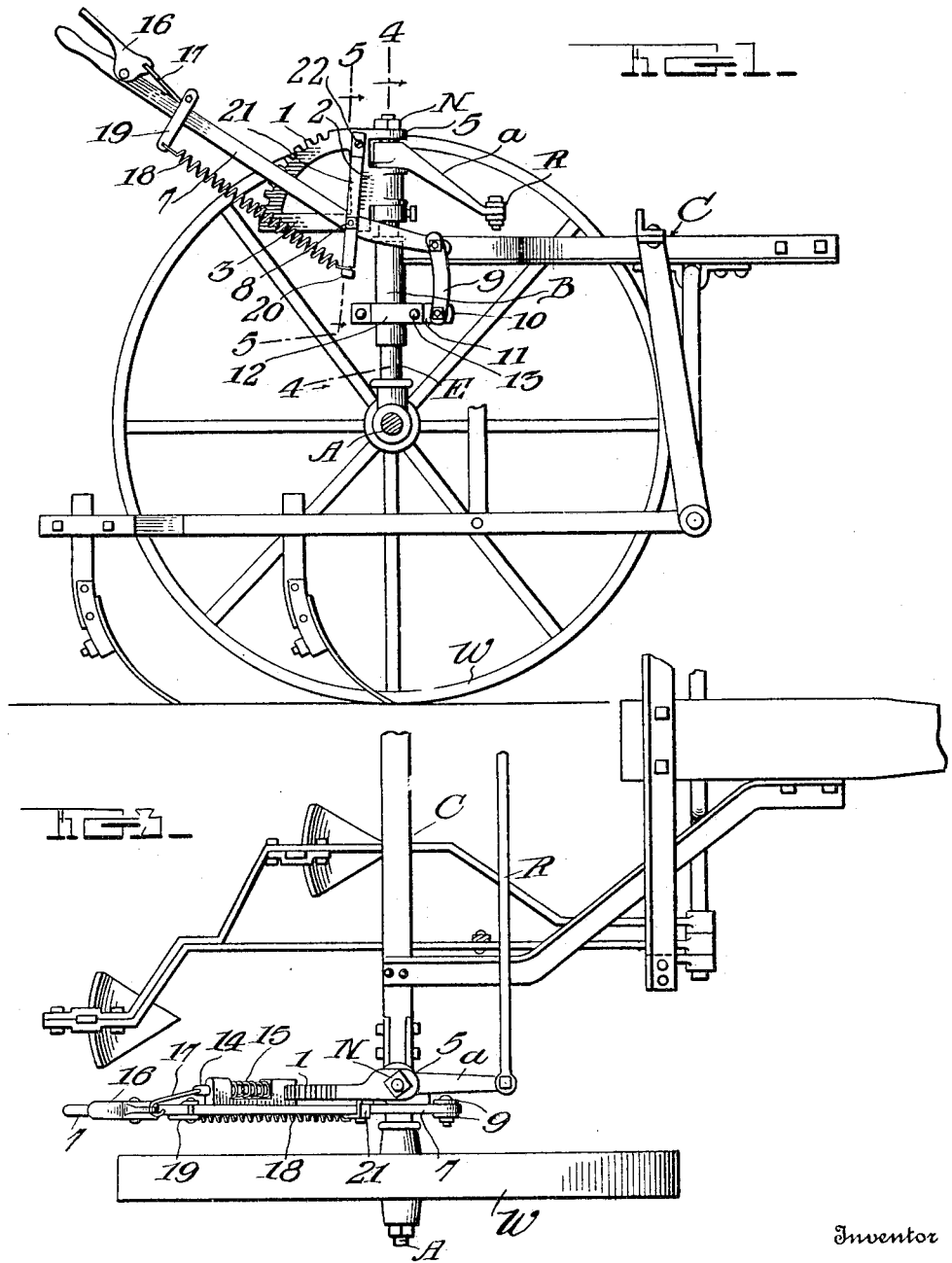

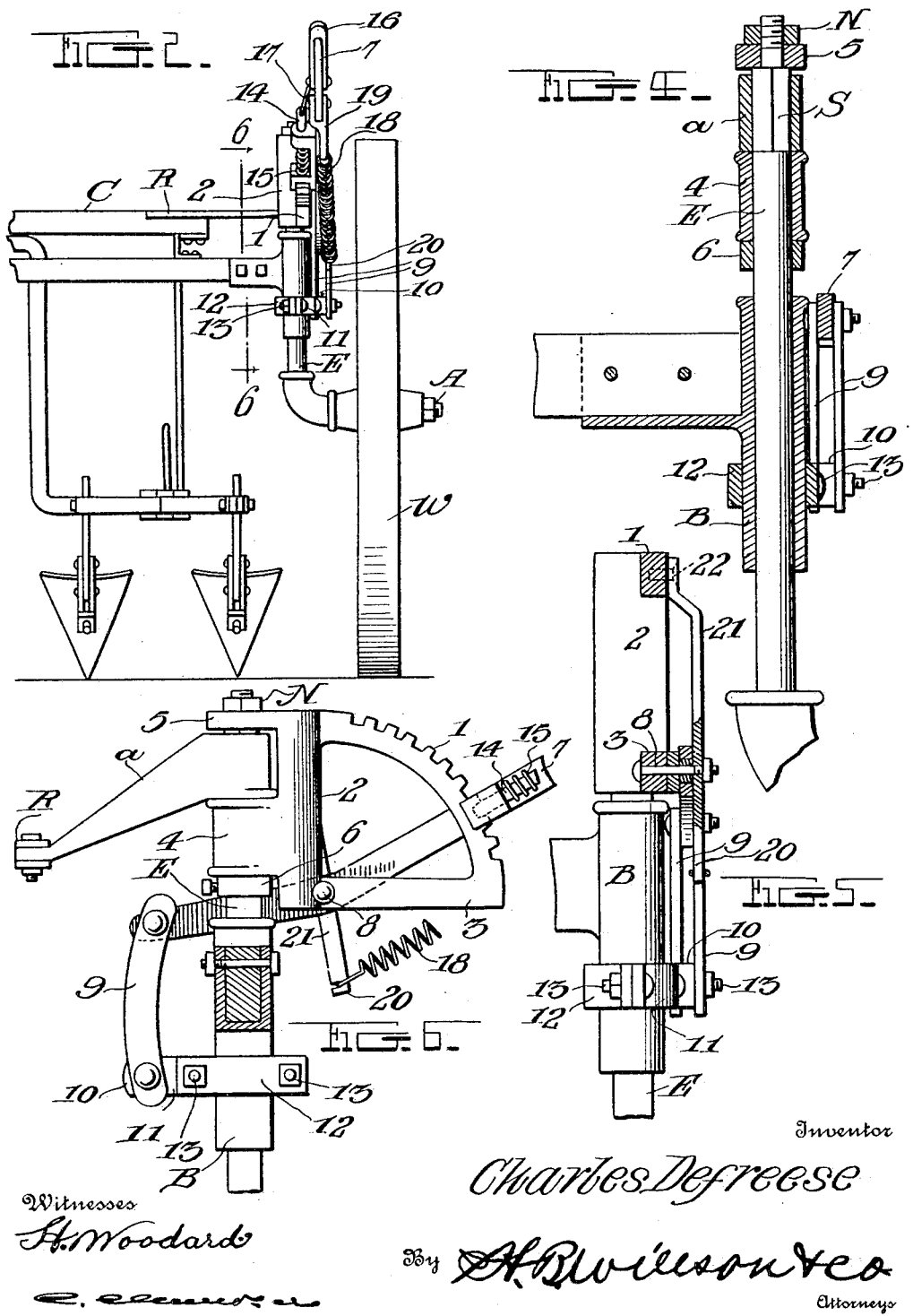

CHARLES DEFREESE, OF WESTPOINT, INDIANA.

RAISING AND LOWERING DEVICE FOR PIVOT-WHEEL CULTIVATORS.

1,117,804. Specification of Letters Patent. Patented Nov. 17, 1914.

Application filed June 1, 1914. Serial No. 842,250.

*To all whom it may concern:*

Be it known that I, CHARLES DEFREESE, a citizen of the United States, residing at Westpoint, in the county of Tippecanoe and State of Indiana, have invented certain new and useful Improvements in Raising and Lowering Devices for Pivot-Wheel Cultivators; and I do declare the following to be a full, clear, and exact description of the invention, such as will enable others skilled in the art to which it appertains to make and use the same.

My invention relates to improvements in raising and lowering means for cultivators and similar agricultural implements and more particularly to those having supporting wheels whose axles are pivoted to swing in horizontal planes.

The primary object of the invention is to provide a device of this character which may be simply and inexpensively constructed and which may be used to great advantage, more particularly when one wheel of the implement runs upon a surface lower than the opposite wheel thereof.

A secondary object of the invention is to construct and mount a segmental rack in such a manner as to allow the same to form a pivotal support as well as a locking means for a raising and lowering lever.

A still further object is to construct said rack in such a manner as to provide a rigid thrust bearing which supports the weight of the implement above the wheel to which it is applied.

A still further object is to provide simple and efficient means whereby the operator may be assisted in raising the implement proper upon its wheels and axles.

With these objects in view, the invention resides in certain novel features of construction and combination herein described and claimed and shown in the drawings wherein:—

Figure 1 is a side elevation, partly in section, of a pivot wheel cultivator, showing the application of my invention thereto; Fig. 2 is a rear elevation of portions of the parts shown in Fig. 1; Fig. 3 is a top plan view thereof; Fig. 4 is a vertical transverse section taken along the plane of the line 4—4 of Fig. 1; Fig. 5 is a similar view on the line 5—5 of Fig. 1; Fig. 6 is a vertical section taken along the plane of the line 6—6 of Fig. 2.

In the accompanying drawings, I have illustrated my invention in connection with a pivot wheel cultivator C, the latter having a pair of upright bearings B which are rigidly carried thereby and in which upright extensions E of supporting axles A are mounted for vertical and rotary movement, the upper ends of said extensions E projecting a suitable distance above the bearings B and being squared as indicated at S for the reception of the inner ends of steering arms $a$, the latter, on the opposite sides of the machine, being connected by a transverse steering rod R. The features so far described and the wheels W, mounted on the axles A, are of common construction and form no part of the present invention although a certain coaction exists between the two.

Disposed in rear of each extension E, is a segmental rack 1 said racks being formed integrally with upright portions 2 and horizontal bars 3, the former being provided with forwardly projecting thrust bearings 4 which are disposed near their lower ends and beneath the arms $a$, other bearings 5 being formed integrally with the upper ends of the portions 2 and having openings alining with the openings in the thrust bearings 4. As clearly shown in the drawings, the thrust bearings 4 loosely receive the upper portions of the extensions E and the bearings 5 likewise loosely receive the extreme upper ends of said extensions which are reduced and externally threaded for the reception of nuts N whereby the racks 1 and the steering arms $a$ are held against dislocation.

For the purpose of relieving the bearings 5 of unnecessary strain, I have provided the thrust bearings 4 with the under sides of which collars 6, secured to the extensions E by means of set screws, contact, thereby causing the major part of the strain to be exerted upon the bearings 4 which are of considerably greater size than said bearings 5.

In order that the bearings B may be raised or lowered upon the extensions E thereby raising and lowering the entire cultivator proper, I have provided a pair of levers 7, the latter being pivoted at 8 to the angular corners of the racks 1 and having their free ends slightly offset and pivotally connected by means of links 9 to ears 10 which are formed on sections 11 of clamps, said sections 11 and their complementary members 12 embracing said bearings B and being rigidly held thereon by means of clamping bolts 13. It will therefore be seen that when the levers 7 are rocked around their pivots 8, their free ends, in moving upwardly or downwardly as the case may be, will likewise move the clamps and the bearings, thus raising or lowering the cultivator to the proper extent. For the purpose of securely locking the levers 7 in any one of their adjusted positions, I provide locking pawls 14 which are normally projected by means of coil springs 15 and which may be retracted by thumb levers 16, through the instrumentality of connecting links 17.

It will of course be obvious that the weight of the cultivator will allow the lowering operation thereof to be a simple one. When the cultivator is to be raised however, considerably more power is required and I have therefore provided coil springs 18 which lie substantially parallel to the levers 7 and have their rear ends secured to clamps 19 which are mounted upon said levers, the forward ends of said strips being secured to depending extensions 20 of upright bars 21 through which the pivots 8 pass and whose upper ends are deflected laterally and provided with attaching lugs or ears through which screws 22 are passed and into the upper ends of the upright portions 2 of the racks. It may be here explained that the inner sides of said upright portions 2 are enlarged laterally in order that the bearings 4 and 5 may be of the necessary proportions.

By the provision of the coil springs 18, it will be seen that the same are expanded when the cultivator is lowered and that their tension is therefore exerted when the pawls 14 are released thus assisting in raising the bearings B and therefore the cultivator.

The device, as above set forth and described becomes particularly advantageous when cultivating land having numerous furrows, in which operation it often becomes necessary to position one side wheel of the cultivator in one of the furrows. This of course lowers this side of the machine and would, under ordinary circumstances, cause the cultivator teeth upon this side to work the earth more deeply than those on the opposite side of the machine. By the use of my invention, however, the active faces of the cultivator teeth may be kept in the same horizontal plane thus causing the soil to be uniformly worked or cultivated.

I have described my invention with considerable minuteness and have set forth certain specific embodiments for carrying out the objects of the invention. I wish it understood however, that I do not wish to be limited to details of construction other than those amplified in the appended claims. Particular emphasis however is laid upon the positioning of the bearings 4 and 5, in connection with the remaining features of the invention, since the thrust bearings B, as hereinbefore set forth receive practically all of the weight of the cultivator while the bearings 5 act as bracing means to prevent the racks from tilting and thereby binding the extensions E to such an extent as to prevent their proper rotation for the purpose of steering. It will furthermore be noted that said bearings 5 securely hold the arms *a* against dislocation.

Having thus described my invention, what I claim as new and desire to secure by Letters Patent is:—

1. The combination with an implement having a supporting axle provided with an upright extension having a removable steering arm, and a supporting frame having a portion loosely receiving said extension, of a segmental rack adjacent the extension and having a pair of vertically spaced bearings mounted thereon above and below the steering arm whereby the latter is held against removal, means whereby said bearings are held against longitudinal movement on the extension, and a lever pivoted to said rack and to a portion of the frame, said lever having a pawl coacting with the rack.

2. The combination with an implement having a supporting axle provided with an upright extension having a removable steering arm and a supporting frame having a portion loosely receiving said extension, of a segmental rack having an elongated thrust bearing and an ear mounted on said extension respectively below and above the arm whereby the latter is held against removal, a stop on the extension and bearing against the thrust bearing, and a lever pivoted to said rack and to a portion of the frame, said lever having a pawl coacting with said rack.

3. The combination with an L-shaped axle having a wheel revolubly mounted on its horizontal arm, a frame having a bearing slidable vertically on the upright arm of said axle, the upper portion of said upright arm being squared and provided with a threaded extension, and a steering arm revolubly mounted on said squared portion, of an upright segmental rack adjacent said upright arm, a thrust bearing formed integrally with said rack and embracing said upright arm below the steering arm, a bearing ear likewise formed integrally with said rack and embracing the threaded extension above the steering arm, a stop on the upright arm below the thrust bearing, a nut on the threaded extension and bearing against said ear, a lever pivoted to said rack and pivotally connected to a portion of the frame, and a pawl on the lever coacting with the latter.

In testimony whereof I have hereunto set my hand in presence of two subscribing witnesses.

CHARLES DEFREESE.

Witnesses:
JOSEPH DE FREESE,
JOHN D. GOUGAR.

Copies of this patent may be obtained for five cents each, by addressing the "Commissioner of Patents, Washington, D. C."